US008043027B2

(12) United States Patent
Duroch et al.

(10) Patent No.: US 8,043,027 B2
(45) Date of Patent: Oct. 25, 2011

(54) DEVICE FOR REGULATING THE BUCKLING OF UNDERWATER PIPES

(75) Inventors: Jean-Francois Duroch, Paris (FR); Sylvain Routeau, Saint Cloud (FR)

(73) Assignee: Technip France (FR)

( * ) Notice: Subject to any disclaimer, the term of this patent is extended or adjusted under 35 U.S.C. 154(b) by 44 days.

(21) Appl. No.: 11/994,609

(22) PCT Filed: Jun. 28, 2006

(86) PCT No.: PCT/FR2006/001509
§ 371 (c)(1),
(2), (4) Date: May 9, 2008

(87) PCT Pub. No.: WO2007/010102
PCT Pub. Date: Jan. 25, 2007

(65) Prior Publication Data
US 2008/0232905 A1 Sep. 25, 2008

(30) Foreign Application Priority Data

Jul. 13, 2005 (FR) ..................................... 05 07518

(51) Int. Cl.
*F16L 1/06* (2006.01)
(52) U.S. Cl. .................. 405/184.4; 405/158; 405/168.1; 405/168.2
(58) Field of Classification Search .................. 405/158, 405/168.1, 168.2, 168.4, 171, 172, 173, 184.4
See application file for complete search history.

(56) References Cited

U.S. PATENT DOCUMENTS

| 3,955,599 | A | | 5/1976 | Walker |
| 4,109,480 | A | | 8/1978 | Sumner |
| 4,138,853 | A | * | 2/1979 | Lamy ............................ 405/171 |
| 4,203,687 | A | * | 5/1980 | Sumner ......................... 405/170 |
| 4,253,779 | A | | 3/1981 | Grougnu |
| 4,315,702 | A | | 2/1982 | Moe et al. |

FOREIGN PATENT DOCUMENTS
FR          2 333 185          6/1977

OTHER PUBLICATIONS

International Search Report dated Nov. 10, 2006 issued in corresponding PCT Application No. PCT/FR2006/001509.
Written Opinion dated Nov. 10, 2006 issued in corresponding PCT Application No. PCT/FR2006/001509.

* cited by examiner

*Primary Examiner* — David Bagnell
*Assistant Examiner* — Benjamin Fiorello
(74) *Attorney, Agent, or Firm* — Ostrolenk Faber LLP

(57) ABSTRACT

For regulating the lateral buckling of a section of pipe, at least one device permanently applies a force to a point on the section of pipe. The force is preferably applied substantially horizontally and perpendicular to the axis of the pipe. Preferably, two of the devices that apply equal and opposing forces are positioned at a distance from each other along the section of a pipe. Each device comprises a clamp, a cable, a return device and a buoy or a weight.

20 Claims, 5 Drawing Sheets

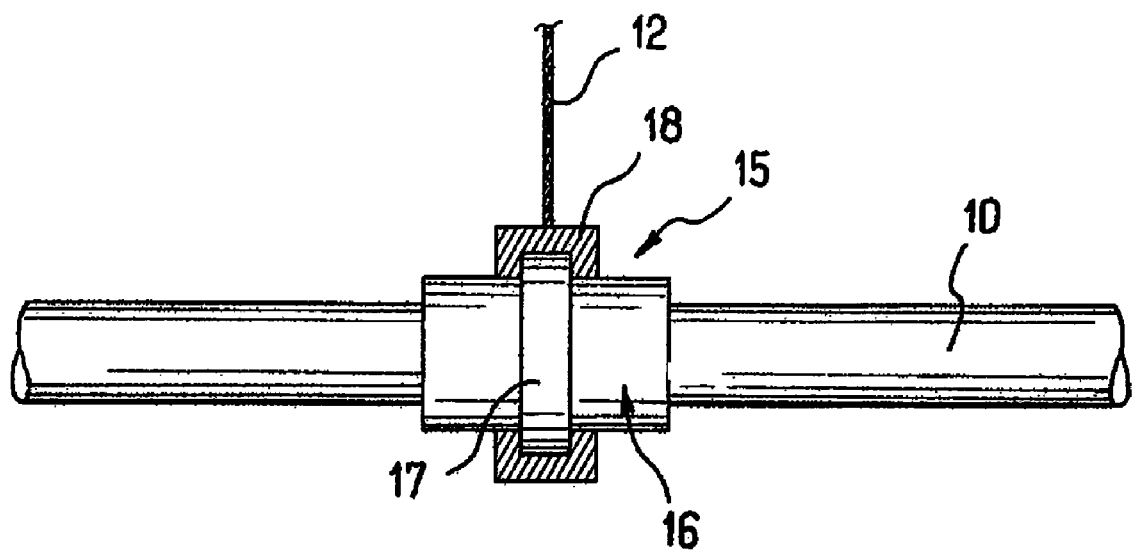
FIG_3
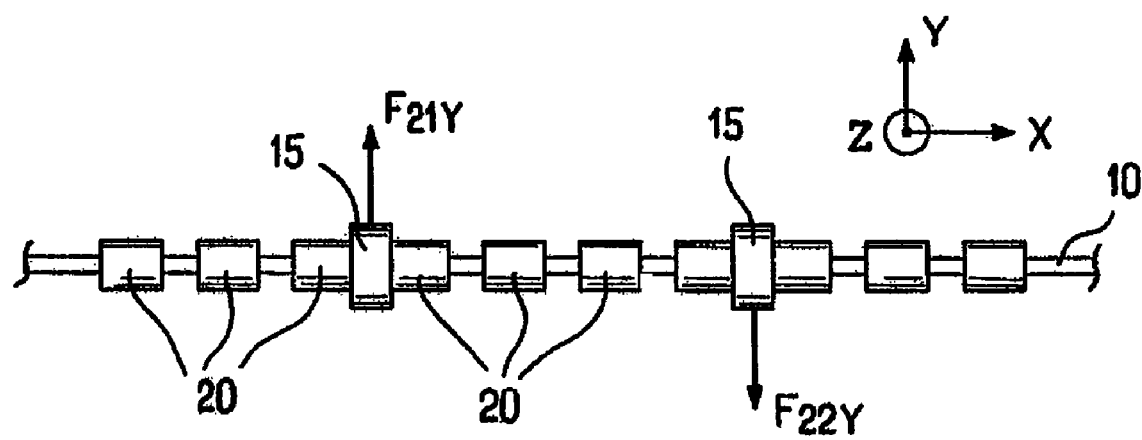
FIG_4

DEVICE FOR REGULATING THE BUCKLING OF UNDERWATER PIPES

CROSS REFERENCE TO RELATED APPLICATION

The present application is a 35 U.S.C. §§371 national phase conversion of PCT/FR2006/001509, filed 28 Jun. 2006, which claims priority of French Application No. 0507518, filed 13 Jul. 2005. The PCT International Application was published in the French language.

BACKGROUND OF THE INVENTION

The invention relates to a device for regulating (controlling) the buckling of a rigid underwater pipe, particularly one for carrying fluids such as hydrocarbons, of the rigid single or double-wall ("pipe-in-pipe") type, with or without thermal insulation.

The problem to be overcome is that of the buckling of the rigid hydrocarbon pipes, under the effect of the axial compressive loads arising from the combined effect of the temperature and pressure of the fluid flowing in the pipe, and the hydrostatic pressure.

Above a certain threshold, these loads can cause the buckling of the rigid pipe.

Two forms of buckling are generally distinguished:
upheaval buckling, in which the pipe becomes detached from the ground and buckles upwards.
lateral buckling, in which the pipe remains on the ground and buckles to the side.

It is important to prevent damage due to the buckling of a rigid pipe which has to undergo large variations of temperature and pressure. It is also important to prevent the buckling or expansion of the pipe from causing damage to the equipment connected to its ends, such as manifolds or crossings.

There are known devices intended to stop the propagation of buckling along an underwater pipe, the said buckling being possibly initiated during the laying of the pipe because of excessive loads in the length of catenary pipe linking the seabed to the laying ship. U.S. Pat. No. 4,300,598, U.S. Pat. No. 3,860,039, GB 1564621, U.S. Pat. No. 5,458,441 and EP 0100099 describe such devices. These devices do not resolve the problem which has arisen.

One known solution consists in burying the pipe in a trench excavated in the ground. This makes lateral buckling impossible, since the pipe is blocked on both sides by the trench. Vertical buckling is still possible, but it can be prevented if the weight of the fill is sufficient. This solution is also uneconomical and is difficult to implement in deep seas (1000 m or deeper).

Another solution consists in the use of expansion elements (flexible pipe links called "jumpers") positioned along the pipe and intended to absorb the axial loads.

GB 2287297 describes a solution consisting in the deliberate deformation of the pipe during laying in such a way as to create regular alternating small bends (in the form of waves) along the length of the pipe. The pipe thus offers less resistance to bending and to small lateral displacements, enabling the compressive loads to be released in a uniform way along the length of the pipe, and preventing buckling and concentrations of loads. This solution is also costly because of the wavelike deformation which has to be created on the laying ship with the aid of special tools.

Other solutions, intended to control (regulate) buckling to ensure that its effects are acceptable, have been the subject of conferences reported in the following publications:

OTC (Offshore Technology Conference) 2003—King Flowlines—Thermal Expansion Design and Implementation.
OMAE (Offshore Mechanics and Arctic Engineering Conference) 1989—Thermal buckling of pipelines close to restraints.

The basic idea common to these solutions is that of carefully distributing a plurality of lateral buckling areas along the pipe, so as to effectively release the axial compressive loads, while ensuring that this buckling remains acceptable. In practice, these solutions use various devices for initiating lateral buckling, permanently installed at the desired positions. Since buckling is more easily initiated in straight sections, it has been envisaged that the pipe could be deliberately bent in the areas in which the development of buckling is desired.

Another solution consists in the local reduction of the weight of the pipe, using permanently fitted buoys: the buoys can be in the form of clamps installed during laying. These buoys reduce the apparent weight of the pipe and thus the lateral friction with the ground. Additionally, the increase in diameter at the positions of the buoys creates a discontinuity of the bending inertia, which in itself is sufficient to promote buckling.

Another known solution for initiating lateral buckling by reducing the lateral friction between the pipe and the ground consists in placing between the sea bed and the pipe transverse sliding beams or cross-members on which the pipe can easily slide laterally.

These beams are generally formed from large-diameter metal tubes. The reduction in lateral friction is partly due to the detachment of the pipeline at its intersection with the beam (absence of ground contact) and partly due to the low coefficient of friction between the pipe and the beam.

These solutions intended to initiate and control lateral buckling do not satisfactorily resolve the problem which has been stated. On the one hand, the initiation of buckling is not totally reliable. On the other hand, these solutions do not make it possible to control the shape (the mode) and amplitude of the buckling and consequently the mechanical stresses in the pipe. Finally, they cannot ensure the reproducibility of the buckling, in respect of its shape and position, throughout the temperature and pressure cycles applied to the pipe.

Lastly, in spite of the large number of proposed solutions, it is found that the problem of effectively regulating the buckling of a pipe laid on a sea bed is still unresolved.

U.S. Pat. No. 3,466,881 discloses a collar limiting the horizontal or vertical displacements of a pipe within the collar. U.S. Pat. No. 3,955,599 discloses a device for imparting a localized curvature to a pipe.

Document WO 03 012327 discloses a device limiting the bending of a flexible pipe.

SUMMARY OF THE INVENTION

None of these documents aim at regulating the buckling of rigid pipes.

The object of the present invention is to propose a simple and economical solution for effectively regulating the lateral buckling, in such a way as to ensure the integrity of the pipe and of the equipment connected to its ends.

The invention achieves its object by means of a device for regulating the lateral buckling of a section of underwater fluid-carrying rigid pipe installed on a sea bed, comprising at least one device for the permanent application of determined force (or which can be determined) to a point of the section of pipe. The force has a horizontal component perpendicular to the axis of the said pipe at the position of the point of application of the force. Advantageously, the applied force is substantially perpendicular to the axis of the pipe. In one embodiment, the applied force is substantially horizontal. The applied force is predetermined or can be predetermined, contrary to, for instance, a force just undergone rather than chosen which would result from undersea currents.

The invention also proposes an expansion accumulator which, by means of the regulation of the buckling, makes it possible to effectively convert the axial expansion of the pipe into lateral expansion, thus limiting the displacements and loads imparted at the ends of the pipe.

Depending on the mode of buckling that is to be given priority, the device of the invention can comprise a single device for the application of force, or, in the preferred version of the invention, two devices for the application of force, and positioned at a specified distance from each other along the section of pipe. They include a first device for application of a first force having a first horizontal component perpendicular to the axis of the pipe at the position of the point of application of the first force, and a second device for application of a second force having a second horizontal component perpendicular to the axis of the pipe at the position of the point of application of the said second force. The first and second components are substantially parallel and are applied in opposite directions.

Advantageously, the intensities of the first and the second component are substantially equal.

Advantageously, the specified distance is in the range from 30 m to 200 m.

Advantageously, the intensity of the horizontal component perpendicular to the axis of the pipe of each applied force is in the range from 300 to 7000 daN.

In a specific embodiment of the invention, the device for application of force comprises a clamp, advantageously made in two parts, surrounding the pipe to fix one end of a linear lateral traction element. Preferably, the clamp is mounted so that it is freely rotatable on the pipe. The other end of the linear lateral traction element is connected to an activator such as a buoy, a weight or a motorized winch. The linear element, which may be a cable or a chain, passes around at least one return element, which may be a pulley or a deflector, according to the design adopted.

Alternatively, the device for application of force can comprise an activator of the jack or spring type.

It is advantageous to provide in the section of pipe where the invention is applied devices intended to facilitate the lateral sliding of the pipe by reducing friction with the sea bed, for example by providing the section with fixed buoys for lightening the pipe or at least one beam for the lateral sliding of the pipe.

By device of the invention is meant the whole of the material means which, in combination with a pipe, permit regulation of the pipe buckling.

The invention also relates to a method for regulating the lateral buckling of a section of underwater fluid-carrying rigid pipe installed on a sea bed, comprising at least the permanent application of a determined force to a point of the section of pipe, wherein the force has a horizontal component perpendicular to the axis of the pipe at the position of the point of application of the force.

The principal advantages of the present invention, with respect to the prior art, are the possibility of precisely controlling the location (in other words, preventing the buckling from propagating along the pipe) and the mode of buckling.

BRIEF DESCRIPTION OF THE DRAWINGS

Other characteristics and advantages of the invention will become clear in the light of the following description, with reference to the attached drawings, in which:

FIG. 3 is a schematic view in horizontal section of the pipe at the position of a rotating clamp for fixing the horizontal cable for application of force.

FIG. 4 is a plan view of a section of pipe equipped, as a variant, with a combination of buoys and fixing clamps for the cable for application of force.

DESCRIPTION OF PREFERRED EMBODIMENTS

Figure 1A:
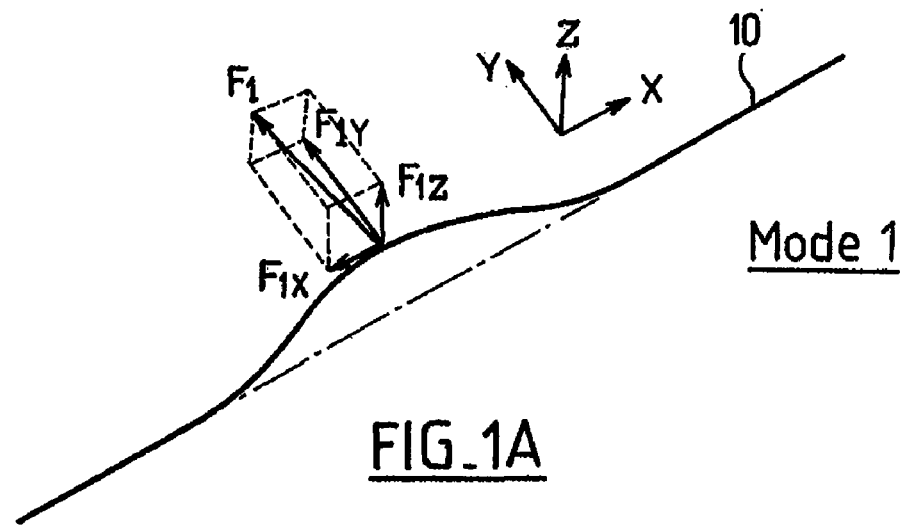
FIG. 1A is a schematic perspective view of a section of pipe according to the first mode of application of a force having a horizontal component perpendicular to the axis of the pipe.

FIG. 1A shows a section of pipe 10 buckling laterally under the effect of a force $F_1$ applied permanently according to the invention. This force is broken down according to the frame of reference XYZ into three perpendicular components $F_{1X}$, $F_{1Y}$ and $F_{1Z}$.

The horizontal component perpendicular to the pipe, $F_{1Y}$, is the essential component for the application of the invention. Unexpectedly, the permanent application of this component $F_{1Y}$ enables the lateral buckling of the pipe 10 to be initiated and controlled effectively.

The vertical component $F_{1Z}$ is not necessary for the application of the invention, but it may have an advantageous effect. This is because, if this component is applied in the upward direction, the resulting effect is equivalent to a local reduction of the weight of the pipe 10, producing a local reduction of the frictional forces between the said pipe and the sea bed and consequently facilitating the initiation and control of the lateral buckling.

The horizontal component parallel to the axis of the pipe, $F_{1X}$, has no effect for the application of this invention. In the interest of effectiveness, it is preferable, but not absolutely necessary, for this component $F_{1X}$ to have a low intensity. In an advantageous embodiment of the invention, the component has an intensity less than that of the component $F_{1Y}$, preferably less than half of that of the component $F_{1Y}$, preferably less than a quarter of that of the component $F_{1Y}$, preferably less than one tenth of that of the component $F_{1Y}$, and preferably less than one fiftieth of that of the component $F_{1Y}$.

In an advantageous embodiment, the applied force $F_1$ is substantially perpendicular to the axis of the pipe 10 at the position of the point of application. In another advantageous embodiment, the applied force $F_1$ is substantially horizontal. In a particularly advantageous embodiment, the applied force $F_1$ is both horizontal and substantially perpendicular to the axis of the pipe 10 at the position of the point of application.

Figure 1B:
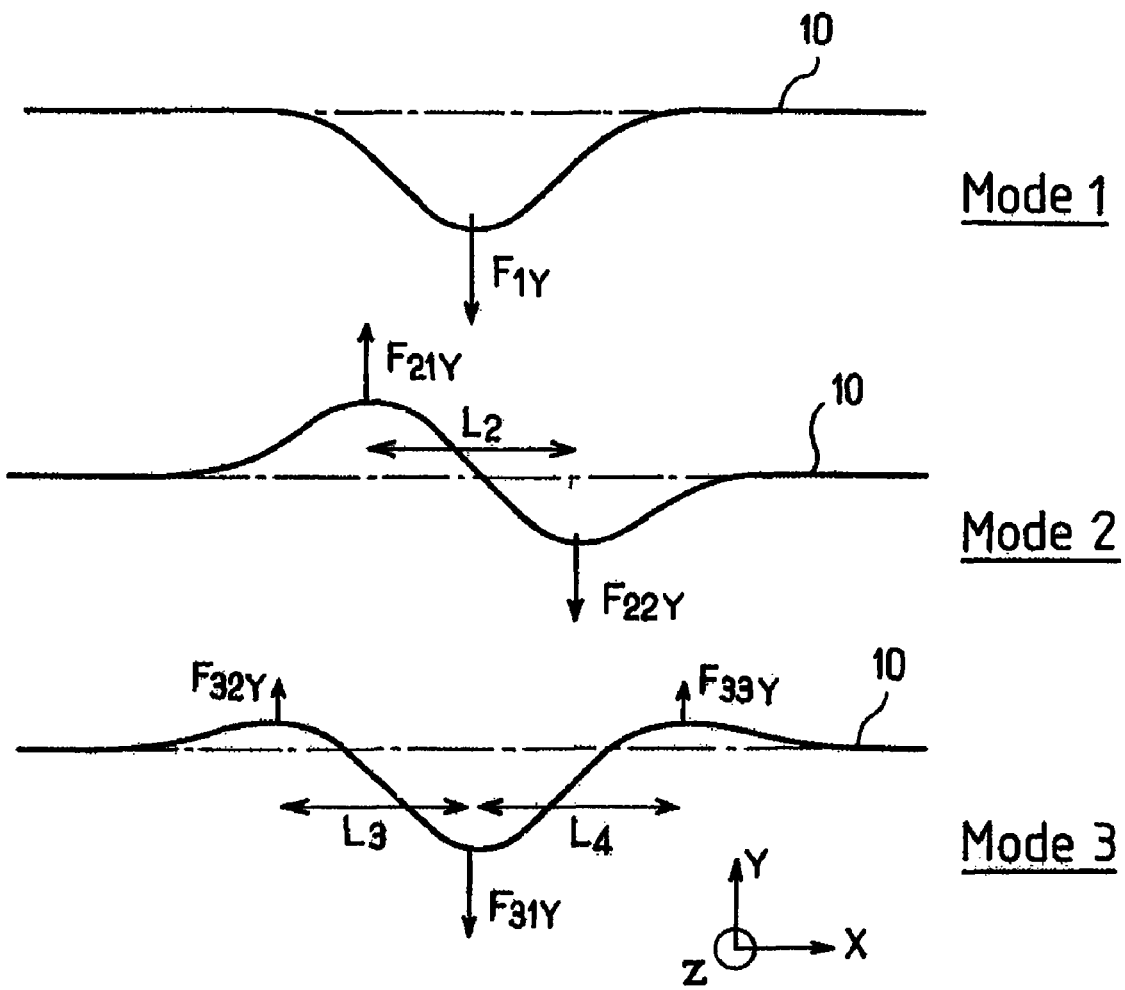
FIG. 1B is a plan view of a section of pipe according to three different modes of application of horizontal force perpendicular to the axis of the pipe.

FIG. 1B shows a section of pipe 10 buckling predominantly in one of the three first buckling modes under the effect of the force or forces $F_1$ applied permanently according to the invention. This figure shows only the components $F_{iY}$ of the applied forces $F_i$, the said components being both horizontal and perpendicular to the axis of the pipe, in other words parallel to the Y axis of the frame of reference XYZ. The components of each force applied along the X and Z axes are not shown, because they play no essential part in the application of the invention. However, it is possible for these components to be different from zero.

In the first mode, a single horizontal force $F_{1Y}$ is applied and causes mode 1 buckling, with a single lateral buckle.

In the second mode, two components $F_{21Y}$ and $F_{22Y}$, oriented in opposite directions, are applied separated along the section of pipe, with a constant separation $L_2$, and the components cause mode 2 buckling, with alternating balanced buckles on either side of the central axis of the non-buckled pipe. In an advantageous embodiment, the relative difference between the intensities of the components $F_{21Y}$ and $F_{22Y}$ is less than 30%, preferably less than 20%, and preferably less than 10%. In a particularly advantageous embodiment, the components $F_{21Y}$ and $F_{22Y}$ have substantially the same intensity.

In the third mode, three alternately opposing components $F_{32Y}$, $F_{31Y}$ and $F_{33Y}$ are applied with separations $L_3$ and $L_4$ which are constant and advantageously substantially equal, and which cause mode 3 buckling, with alternate unequal buckles on either side of the central axis of the non-buckled pipe. In an advantageous embodiment, the intensities of the components $F_{32Y}$ and $F_{33Y}$ are substantially equal to half of the intensity of the component $F_{31Y}$.

Although variants with more than three forces can be imagined in theory, they are of no practical interest because of the complexity of the associated devices. Additionally, as regards the design of the pipe, the most favourable mode is the second mode: this is because, for an equal maximum permitted load at the position of buckling (for example 90% of the elastic limit), this enables the strongest axial compressive loads to be released; on the other hand, it also provides the best lateral stability (in the course of buckling and return cycles) because of the application of two forces in opposite directions.

The intensity of the forces $F_{iY}$ to be applied to initiate and control the buckling is much less than the intensity of the axial compressive forces which are released during buckling. This is a particularly advantageous characteristic of the invention, because it permits the use of forces $F_{iY}$ with a relatively low intensity, which can therefore be generated by simple and economical devices.

The intensity of the force $F_{iY}$ horizontal and perpendicular to the axis of the pipe of each force $F_i$ applied is in the range from 100 to 10000 daN, and advantageously from 300 to 7000 daN.

In the case of modes 2 and 3, the distances $L_i$ between the points of application of the forces are advantageously in the range from 30 to 200 m. They are calculated for each specific case at the design stage, according to the structure of the pipe, so as to ensure that the buckling is acceptable and effective.

The invention can be applied simply and reliably by means of a device such as that described below with reference to FIG. 2, in the specific case of the second buckling mode. Each force which is substantially horizontal and perpendicular to the axis of the pipe is generated by a totally immersed buoy 11, connected to the section of pipe 10 by a cable or a chain 12 via an angle return device 13 anchored to the ground by an anchor device 14, the angle return device being of the deflector (FIG. 2) or pulley type.

The connection between the pipe 10 and the chain 12 can be made by means of a clamp 15. This is advantageously made in two parts which are clamped around the pipe 10 and installed on the laying ship. To facilitate installation, it is possible to provide a degree of freedom of rotation about the axis of the pipe between the clamp 15 on the one hand and the point of attachment of the chain or cable 12 on the other hand. For example, as shown in FIG. 3, the clamp can comprise a fixed part 16 directly clamped on to the pipe, in the form of a sleeve having a peripheral rib 17 and a rotatable part in the form of a flange 18 which covers the rib 17. The sleeve 17 and the flange 18 can themselves be made in two pieces to facilitate their mounting on the pipe 10.

The buoy 11 is relatively compact (with a side measurement of the order of 1 to 2 m) because of the small forces to be produced.

Figure 2:
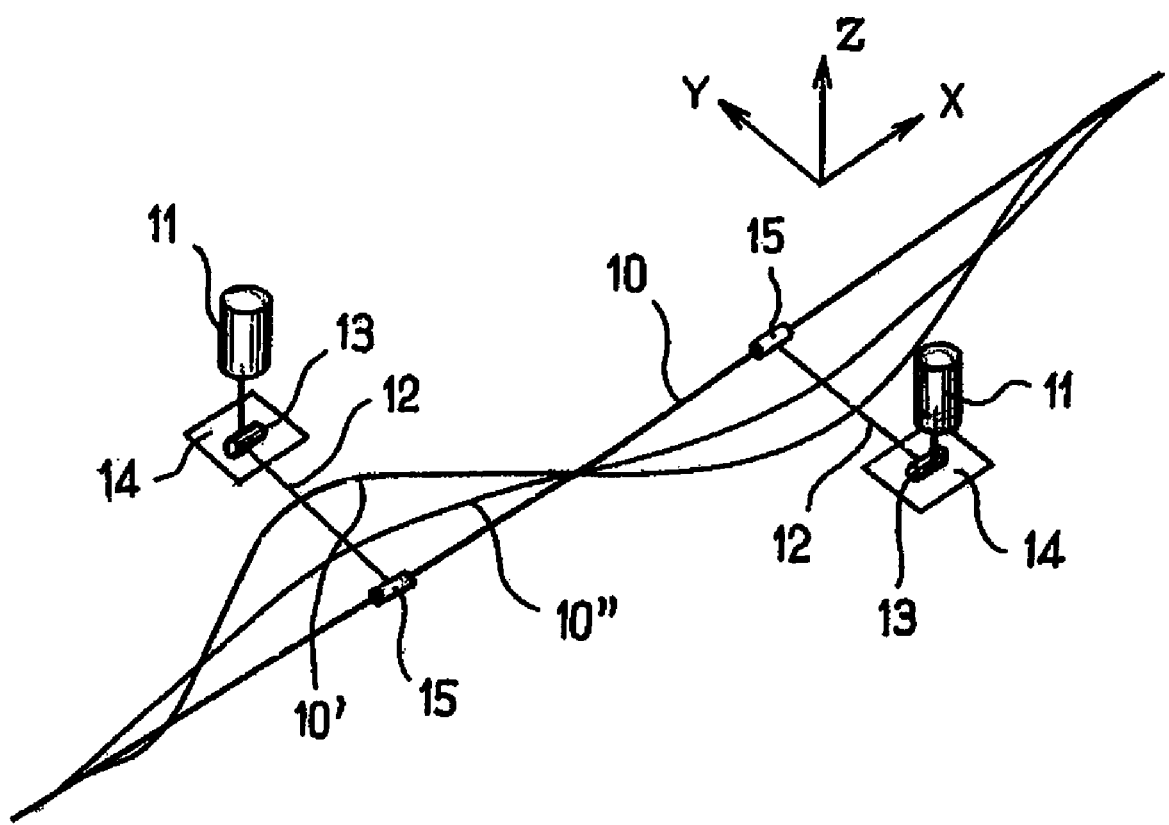
FIG. 2 is a schematic perspective view of a pipe with a device for regulating lateral buckling in mode 2.

FIG. 2 shows the straight pipe 10, as installed before buckling, substantially horizontal, equal and opposing forces being applied to a section of this pipe by the devices 11-15 at points of the section approximately 60 m apart. Under the action of the heating and pressurization of the pipe 10, the latter buckles predominantly in the equipped section, in mode 2, and assumes the position 10', with two marked buckles (the maximum lateral displacement can be of the order of ten meters). After cooling and depressurization, the pipe returns to an intermediate position 10" between the initial position 10 and the buckling position 10', this intermediate position manifesting, for example, the effect of the friction between the pipe and the ground.

It may be advantageous to combine the present invention with one of the prior solutions intended to reduce the lateral friction between the pipe and the ground. This is because the reduction of the lateral friction facilitates the initiation of the buckling: it is possible to reduce the horizontal forces "$F_{iY}$"; fewer loads are generated for the same effectiveness, and the hysteresis of the buckling positions is reduced: if the lateral friction were totally eliminated, the pipe would always tend to return to the same initial configuration (straight, for example) between two successive buckling cycles.

In practice, several variant combinations can be considered.

In the combination shown in FIG. 4, the pipe is supported in the buckling area by fixed buoys 20 installed at the time of laying. These buoys reduce the apparent weight of the pipe 10, and may even, depending on the design adopted, cause the local detachment of the pipe 10 from the sea bed. The clamp or clamps 15 for fixing the chain or chains are interposed between the buoys 20, or can be fixed directly to buoys provided for this purpose, which can be substantially in the form of the sleeves 16 of FIG. 3.

Figure 5A:
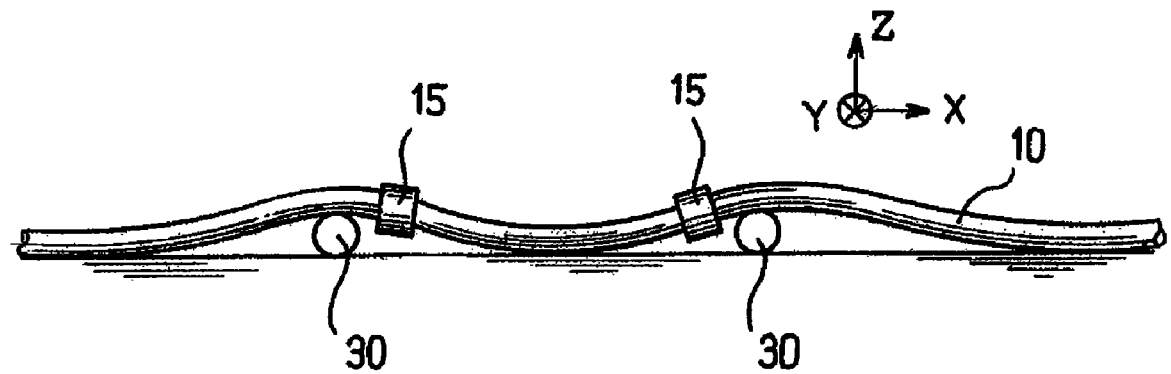
FIGS. 5A and 5B show, in profile and in plan respectively, another combination of sliding pieces and fixing clamps for the cable for application of force.
Figure 5B:
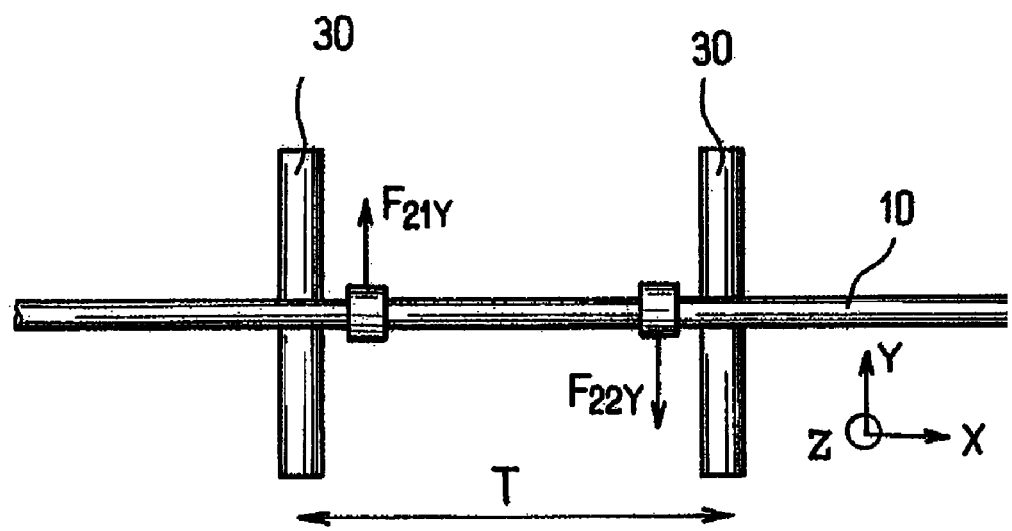

In another combination shown in FIGS. 5A and 5B, one or more sliding beams 30 are installed in the buckling area, transversely with respect to the pipe 10, for the purpose of facilitating the lateral sliding of the pipe during buckling. The spacing T between the beams can be several tens of meters, and the length of each beam can also be several tens of meters. Each beam can be formed in a known way by a tube positioned transversely under the pipe 10.

According to FIG. 2, the applied force is created by a buoy system 11, but clearly any other type of device can be used. For example, FIGS. 6A and 6B show the application of a force F by means of a cable or chain 12 having one end attached to a clamp 15 of the pipe 10 and its other end put under permanent tension by a weight 11' having a density greater than that of water, one or more pulleys 13' providing the necessary returns.

Figure 6A:
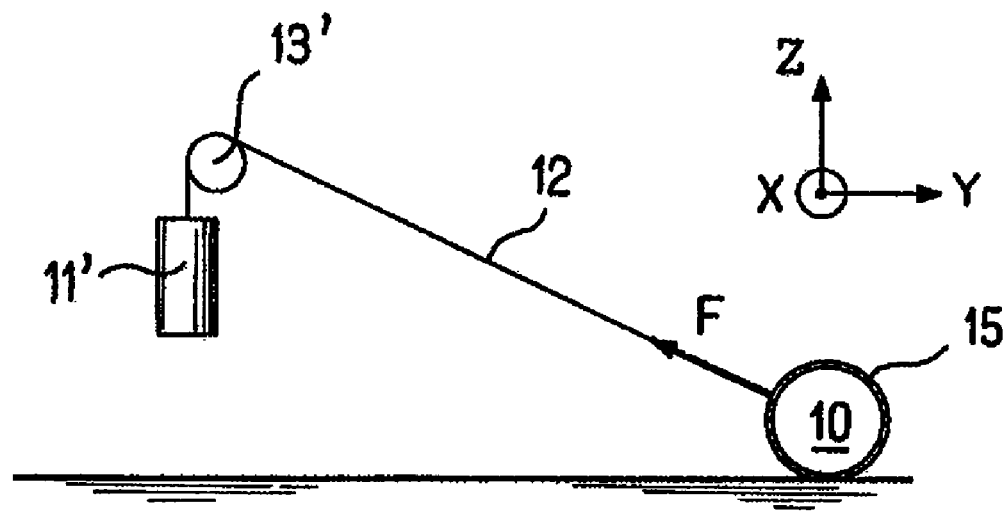
FIGS. 6A and 6B are schematic transverse views of two variant embodiments of a device for application of a force having a horizontal component perpendicular to the axis of the pipe.
Figure 6B:
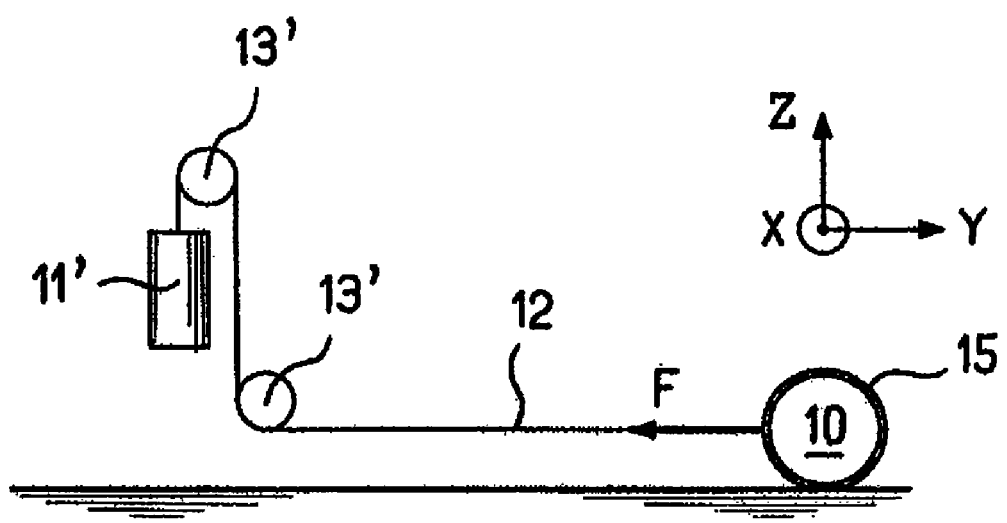

The configuration shown in FIG. 6A makes it possible to combine in a simple and economical way the application of a horizontal force $F_Y$ perpendicular to the pipe 10, intended to initiate and control the lateral buckling, with a vertical force $F_Z$ having the effect of locally reducing the apparent weight of the pipe, and therefore the lateral friction with the ground.

It would be possible to have an actuator using a pneumatic, hydraulic or electric jack, or a motorized winch, or an extension or compression spring.

In practice, a device according to the present invention permits the effective release and control of the axial compressive loads in a section of pipe having a length from 1 to 4 km, this length depending primarily on the characteristics of the pipe and the sea bed, the temperature and pressure of the fluid carried, and the hydrostatic pressure.

In the case of a pipe of greater length, of the order of ten kilometers for example, it is necessary to provide a plurality of devices according to the present invention, and to distribute them along the pipe at mean intervals in the range from 500 m to 4 km. As the possible level of the axial compressive loads increases (where the pipe carries a fluid at high temperature, for example), this interval must be decreased in order to release the said loads effectively while avoiding the generation of unacceptable and uncontrollable buckling.

The invention claimed is:

1. A device for regulating the lateral buckling of a section of underwater, fluid-carrying assembled rigid pipe installed on a sea bed, comprising:
   at least one device operable for permanent application of a determined force to a point along a first section of the assembled rigid pipe, the device being operable to apply the determined force having a horizontal component which is perpendicular to a longitudinal axis of the assembled rigid pipe at the position of the point of application of the determined force,
   wherein the magnitude and direction of the determined force generates buckling of the first section of the assembled rigid pipe to one lateral side of the longitudinal axis of the assembled rigid pip;
   the longitudinal axis of the assembled rigid pipe being defined before application of the first and second determined force.

2. The device according to claim 1, wherein the at least one device is configured and operable to apply the determined force substantially perpendicular to the longitudinal axis of the pipe.

3. The device according to claim 1, wherein the at least one device is configured and operable to apply the determined force substantially horizontally.

4. The device according to claim 1, wherein the at least one device comprises first and second devices configured and operative for the permanent application of first and second determined forces respectively, the first and second devices being positioned at a specified distance from each other along the assembled rigid pipe, the first device being operable for application of a first determined force having a first horizontal component which is perpendicular to a longitudinal axis of the assembled rigid pipe at a first point of application of the first determined force along the first section of the assembled rigid pipe, the magnitude and direction of the first determined force generating buckling of the first section of the assembled rigid pipe to one lateral side of the longitudinal axis of the assembled rigid pipe, and
   the second device being operable for application of a second determined force having a second horizontal component which is perpendicular to the longitudinal axis of the assembled rigid pipe at a second point of application of the second force along a second section of the assembled rigid pipe, the magnitude and direction of the second determined force generating buckling of the second section of the assembled rigid pipe to one lateral side of the longitudinal axis of the assembled rigid pipe,
   the longitudinal axis of the assembled rigid pipe being defined before application of the first and second determined forces.

5. The device according to claim 4, wherein the first and second devices are configured and operative to apply the respective first and second determined forces such that the intensities of the first and the second horizontal components are substantially equal.

6. The device according to claim 4, wherein the specified distance is in the range from 30 to 200 m.

7. The device according to, claim 4, wherein the first and second devices are configured and operative to apply the respective first and second determined forces such that the intensities of the first and second horizontal components perpendicular to the longitudinal axis of the assembled rigid pipe are each in the range from 300 to 7000 daN.

8. The device according to claim 4, further comprising first and second anchor devices, each secured to the ground and positioned laterally of the longitudinal axis of the assembled rigid pipe on opposite sides of the longitudinal axis from one another, wherein the first and second devices are configured and operative for the permanent application of first and second determined forces which bear against the first and second anchor devices, respectively.

9. The device according to claim 1, wherein the at least one device comprises a clamp surrounding the assembled rigid pipe, and a linear lateral traction element having one end fixed by the clamp.

10. The device according to claim 9, wherein the clamp is mounted freely rotatably on the assembled rigid pipe.

11. The device according to claim 9, wherein the linear lateral traction element has another end connected to an actuator selected from the group consisting of a buoy, a weight and a motorized winch.

12. The device according to claim 11, further comprising at least one return element comprised of a pulley or a deflector over which the linear element passes.

13. The device according to claim 9, wherein the device for application of force comprises an actuator comprising a jack or a spring.

14. The device according to claim 1, further comprising buoys at the first section of the assembled rigid pipe operable for lightening the assembled rigid pipe.

15. The device according to, claim 1, further comprising at least one beam in the section for the lateral sliding of the assembled rigid pipe.

16. The device according to claim 1, further comprising an anchor device secured to the ground and positioned laterally of the longitudinal axis of the assembled rigid pipe, wherein the device is operable for permanent application of a determined force to a point along a first section of the assembled rigid pipe which bears against the anchor device.

17. A method for regulating the lateral buckling of a section of underwater, fluid-carrying rigid pipe installed on a sea bed when the rigid pipe is assembled and fluid is flowing in the rigid pipe, and the assembled rigid pipe is subjected to axial compressive loads arising from the combined effect of temperature and pressure of fluid flowing in the assembled pipe, comprising permanently applying a first determined force to a first point along a first section of the assembled rigid pipe, wherein the first determined force has a first horizontal component which is perpendicular to a longitudinal axis of the assembled rigid pipe, and at a position of the point of application of the first determined force, the magnitude and direction of the determined force generating buckling of the first section of the assembled rigid pipe to one lateral side of the longitudinal axis of the rigid pipe, the longitudinal axis of the assembled rigid pipe being defined before application of the first determined force.

18. A method according to claim 17, further comprising, permanently applying a second determined force to a second point along a second section of the assembled rigid pipe, wherein the second determined force has a second horizontal component which is perpendicular to a longitudinal axis of the rigid pipe and at a second position at a second point of application of the second determined force, the magnitude and direction of the second determined force generating buckling of the second section of the rigid pipe, the buckling being to one lateral side of the longitudinal axis of the rigid pipe, the longitudinal axis of the assembled rigid pipe being defined before application of the first and second determined forces.

19. A method according to claim 18, wherein the first determined force and the second determined force are substantially parallel and in opposite directions.

20. A method according to claim 19, wherein the intensities of the first and the second horizontal components are substantially equal.

* * * * *